United States Patent [19]
Konrardy et al.

[11] Patent Number: 5,891,266
[45] Date of Patent: Apr. 6, 1999

[54] METHOD AND SYSTEM FOR CUTTING HUB BORES IN RAILROAD WHEELS

[75] Inventors: Neil E. Konrardy, Lombard; C. Dale Christie, Naperville; Daniel H. Gray, Bartlett; Brian L. VanLaar, Lisle, all of Ill.

[73] Assignee: Amsted Industries Incorporated, Chicago, Ill.

[21] Appl. No.: 998,905

[22] Filed: Dec. 29, 1997

[51] Int. Cl.⁶ ........................................ B23K 7/00
[52] U.S. Cl. ............................. 148/196; 148/205; 266/77
[58] Field of Search ................................. 148/194, 196, 148/205; 266/48, 77

[56] References Cited

U.S. PATENT DOCUMENTS

| | | | |
|---|---|---|---|
| 2,184,562 | 12/1939 | Rockerfeller et al. | 148/205 |
| 2,271,613 | 2/1942 | Babcock et al. | 266/48 |
| 2,317,239 | 4/1943 | Youch | 266/77 |
| 2,345,688 | 4/1944 | Smith | 148/194 |
| 2,492,526 | 12/1949 | Gebig | 266/77 |
| 2,521,669 | 9/1950 | Roundtree | 266/77 |

*Primary Examiner*—Scott Kastler
*Attorney, Agent, or Firm*—Edward J. Brosius; F. S. Gregorczyk; Stephen J. Manich

[57] ABSTRACT

A method and system for cutting hub bores in metal railroad wheels is disclosed. The system includes a lead and second torch for cutting the hub bores. In the method, the lead torch is moved to an initial position above the wheel. The lead torch is energized and moved to cut through a part of the wheel. The second torch is moved to an initial position above the wheel. The second torch is then energized and moved to cut through a part of the wheel. The entire hub bore is cut in the wheel. Additional torches may also be provided. A gantry system for supporting the lead and second torches is disclosed. The gantry system includes lead and second linear movement means arranged parallel to each other and a third linear movement means perpendicular to the lead and second linear movement means. The gantry system also includes a lead torch carriage means for supporting the lead torch and a second torch carriage means for supporting the second torch. The lead torch carriage means is connected to be movable by the lead linear movement means and the second torch carriage means is connected to be movable by the second third linear movement means. The lead and second linear movement means are supported by the third linear movement means and connected for independent movement along the third linear movement means. The hub-cutting system may include a position sensing means, a temperature sensing means, and a control means that allows the movement and speed of the lead torch and second torch to be adjusted based upon the sensed position and temperature of the wheel.

20 Claims, 6 Drawing Sheets

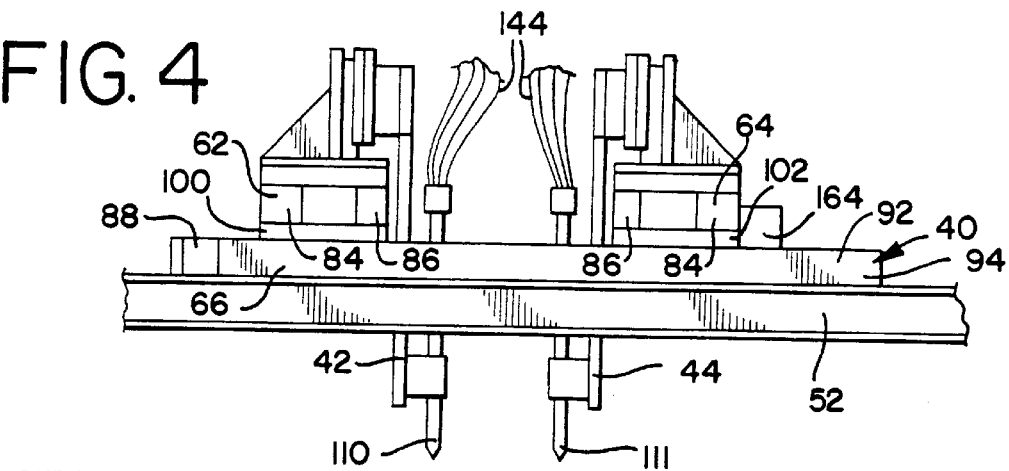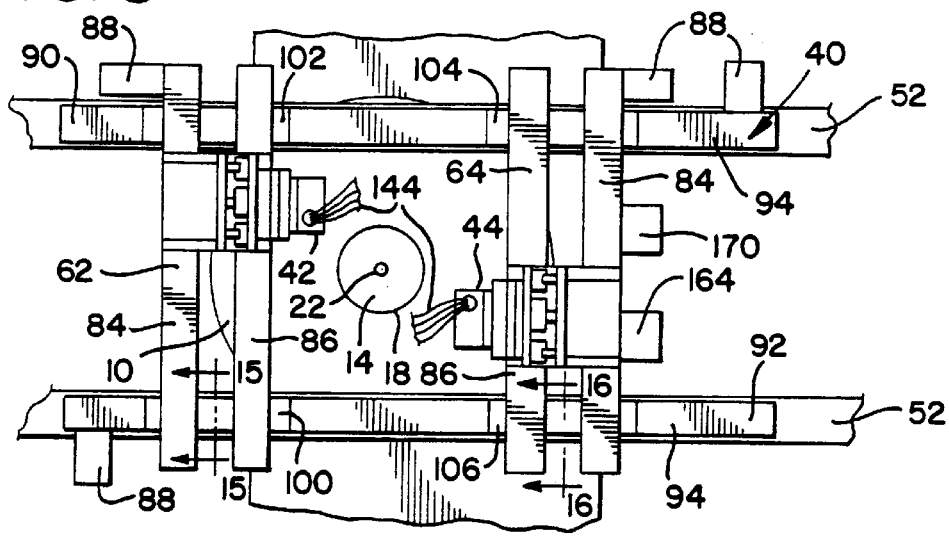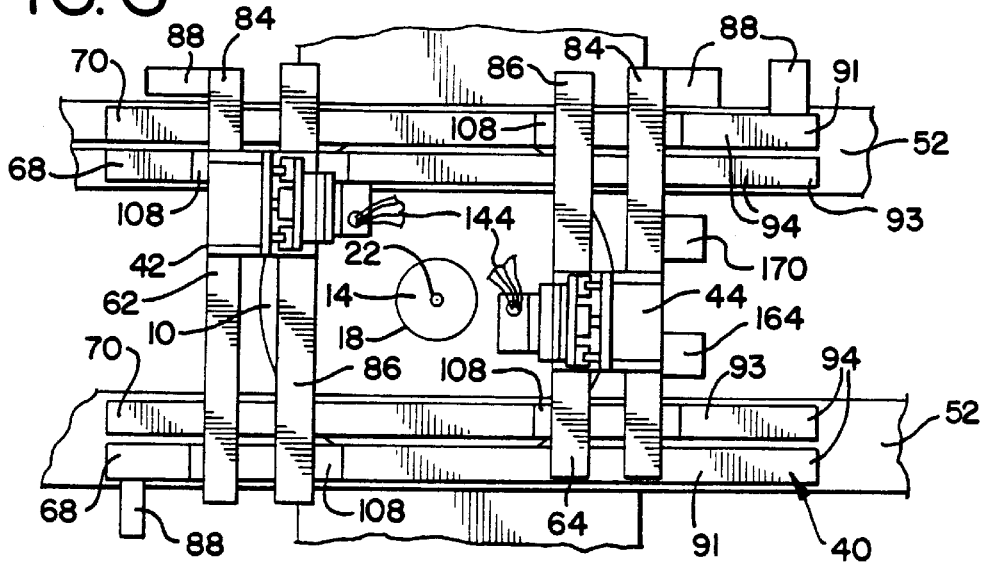

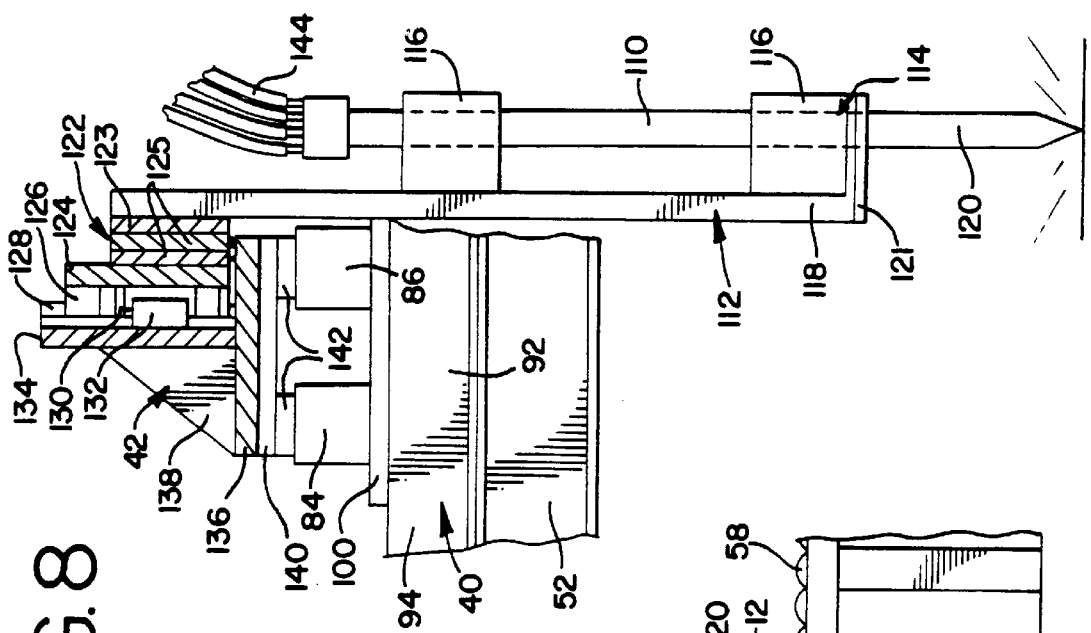
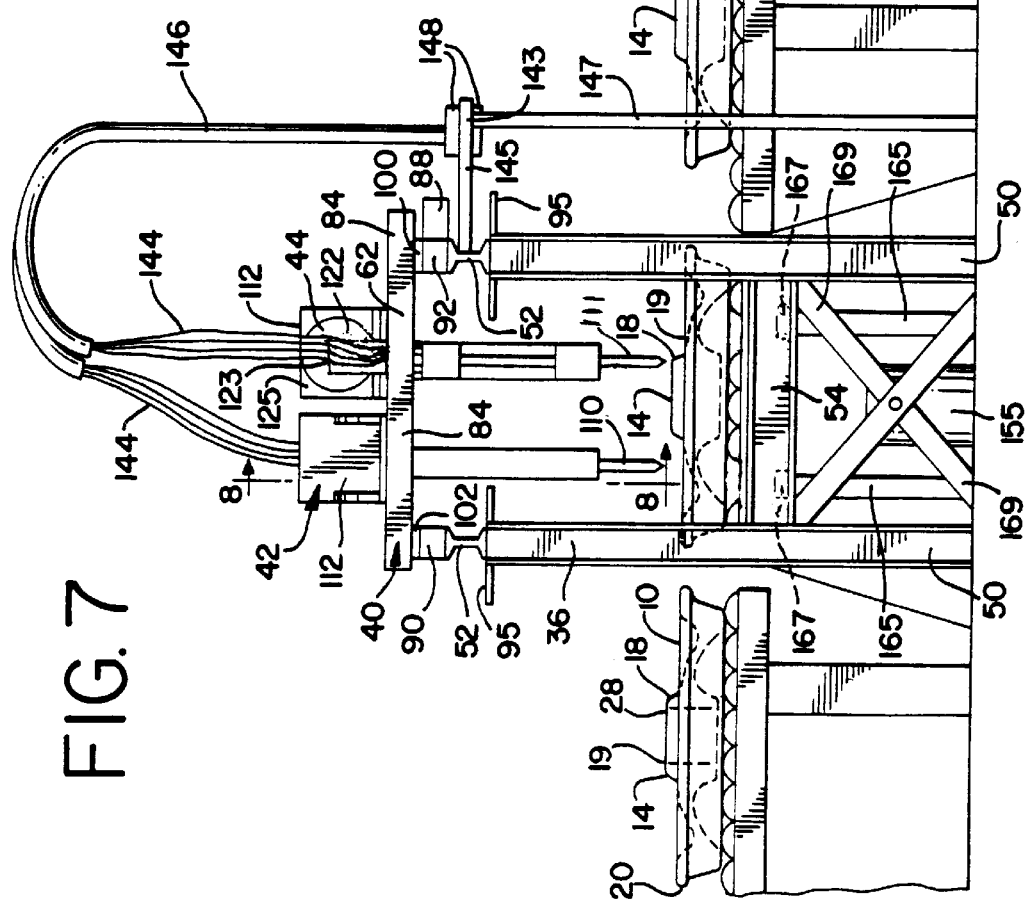

METHOD AND SYSTEM FOR CUTTING HUB BORES IN RAILROAD WHEELS

BACKGROUND OF THE INVENTION

1. Field of the Invention

The present invention relates to the manufacture of railroad wheels, and more particularly to the forming of bores in the hubs of railroad wheels through which axles may be received.

2. Description of the Prior Art

Steel railroad wheels have traditionally been made by casting the wheels. As part of the production of such cast steel railroad wheels, it has been necessary to form a bore in the central hub of the wheel so that the end of an axle may be inserted through the hub bore to mount the wheel on the axle. The hub bores have been formed through cutting with a torch followed by machining. Since the hub may be on the order of 6–8 inches in thickness, cutting the hub bore through this thickness of steel may take some time, and this operation typically comprises a bottleneck in the production of the wheels. Accordingly, it has been necessary to remove the wheels from the production conveying line for cutting the hub bores.

One prior art system for cutting the hub bores has used a rotating lift assembly to remove a wheel from a conveyor line and place the wheel at a hubcutting station. The railroad wheel is centered using opposed hydraulic cylinders and rotatable bearing rollers to force the railroad wheel into the desired position. The railroad wheel has a hollow steel pipe in the center of its hub. A torch assembly is then pivoted about a horizontal axis down into position over the railroad wheel. The torch assembly has a cutting torch attached to a rotatable mechanism. The lit cutting torch is positioned at the center of the railroad wheel hub with its flame traveling down the hollow steel pipe in the center of the railroad wheel hub. After the torch has pre-heated the underlying material, the torch begins cutting. The torch cuts through the railroad wheel hub in a radial direction to a pre-determined hub bore radius, and then moves around a circular path to cut the entire hub bore. When cutting is complete, the hub center should fall free from the torch-bored wheel. The torch assembly is pivoted up out of position and the railroad wheel is then placed back on the conveyor line by the rotating lift assembly, which places another railroad wheel in position at the torch cutting assembly mechanism.

The prior art hub cutting method and system has been deficient in several respects. The existing drive mechanism for the torch uses both a linear drive for the initial radial cut outward from the center of the wheel to a ring gear, and a circumferential drive that engages and drives the torch around the circumference of the ring gear to complete the cut. The drive train for both the linear and circumferential drives consists of a motor, gearbox and chain drive connected to the axis of motion. As the chain may wear and stretch over time, there may be problems with repeatably positioning the torch for the production of many wheels.

For the necessary rotary motion of the torch, the prior art has relied upon a rack and pinion arrangement connected to the chain drive and attached to the ring gear that must be lubricated. But in this environment, the hot railroad wheels may be on the order of 850 degrees F. at this point in the process. Radiant heat from the railroad wheels may tend to cause the lubricating grease to congeal, creating problems with the meshing of the gears. If the gears are not properly meshed, the torch may jump and gouge the railroad wheel, which may require scrapping the wheel if the gouge is deep enough.

In addition, the hub center does not always fall free from the railroad wheel after the hub cut is complete. It has sometimes been necessary for an operator to strike the hub center with a device such as a sledgehammer to free the hub center from the remainder of the wheel after cutting. Such a manual operation not only further slows down the manufacturing process but also may be hazardous.

In addition, with the present mechanical wheel centering device, as the rollers wear, the position of the rollers must generally be adjusted to keep the wheel in the exact center of the machine with respect to the torch. Otherwise, the hub bore cuts may be off-center, which may require the railroad wheel to be scrapped.

BRIEF SUMMARY OF THE INVENTION

One object of the present invention is to speed the process of cutting bores in the hubs of metal railroad wheels. Other objects will become apparent from the following specification.

In one aspect the present invention provides a method of cutting an object. The method comprises the steps of providing an object to be cut and providing a cutting apparatus with a movable lead torch and a movable second torch for cutting the object. The lead torch is moved to an initial position near the object and energized and moved to cut through a part of the object. The second torch is moved to an initial position near the object and energized and moved to cut through a part of the object. The lead and second torches are capable of being moved independently of one another.

In another aspect the present invention provides a system for cutting objects. The system comprises a lead torch, a second torch, and a gantry system for supporting the lead and second torches. The gantry system includes lead and second linear movement means arranged parallel to each other and a third linear movement means perpendicular to the lead and second linear movement means. The gantry system also includes a lead torch carriage means for supporting the lead torch and a second torch carriage means for supporting the second torch. The lead torch carriage means is connected to be movable by the lead linear movement means and the second torch carriage means is connected to be movable by the second linear movement means. The lead and second linear movement means are supported by the third linear movement means and connected for independent movement along the third linear movement means.

BRIEF DESCRIPTION OF THE DRAWINGS

FIG. 4 is an elevation of one embodiment of a gantry system that may be used with the method and system of the present invention.

FIG. 5 is a top plan view of the gantry system of FIG. 4.

FIG. 6 is a top plan view of an alternate embodiment of a gantry system that may be used with the method and system of the present invention.

FIG. 7 is an end view of the hub-cutting station of FIG. 3.

FIG. 8 is a cross-section taken along line 8—8 of FIG. 7 showing details of the torch assembly structure.

DETAILED DESCRIPTION OF THE INVENTION

Figure 1:
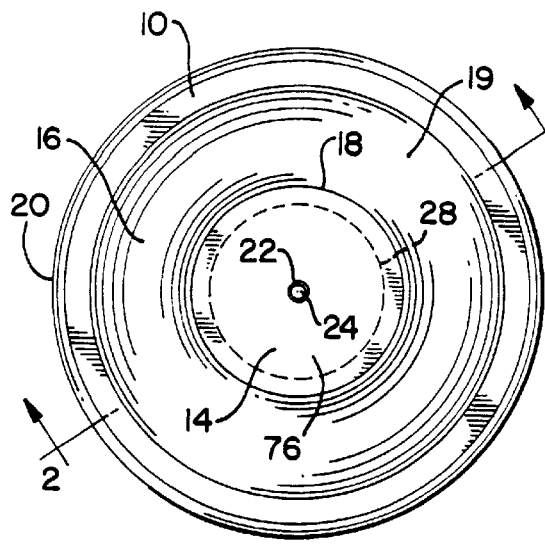
FIG. 1 is a top plan view of a typical cast steel railroad wheel as it is received at a hub-cutting station, with the position of the hub bore to be cut shown in phantom lines.
Figure 2:
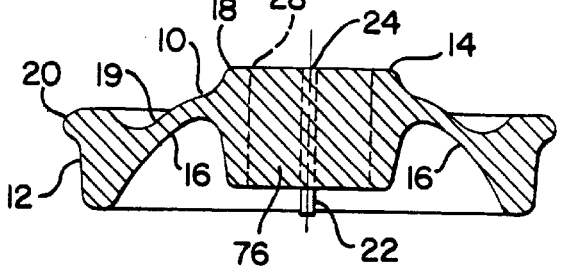
FIG. 2 is a cross-section taken along line 2—2 of the railroad wheel of FIG. 1.

A typical railroad wheel as it is received at the hub cutting station of the present invention is illustrated in FIGS. 1–2. The railroad wheel 10 has an outer tread 12, an inner central hub portion 14, and a web 16 connecting the inner central hub portion 14 and outer tread 12. On the top side 19 of the wheel 10, the central hub portion 14 has an outer circumferential edge 18 and the wheel has an outer diameter 20. The railroad wheel 10 typically has a central hollow steel tube or stopper pipe 22 at this stage of the production, held in place generally at the center 24 of the hub portion 14. The stopper pipe 22 is so placed during the casting process, and remains so positioned as a remnant of the casting process.

A hub bore 28, shown in phantom in FIGS. 1–2, is not cast in the wheel but is cut into the cast steel wheel during production at a hub-cutting station 30. At the time the hub-cutting station 30 is reached, the wheel 10 may have a temperature of about 850 degrees F., although the temperature may vary depending on factors such as the time from casting to reach the hub-cutting station.

Figure 3:
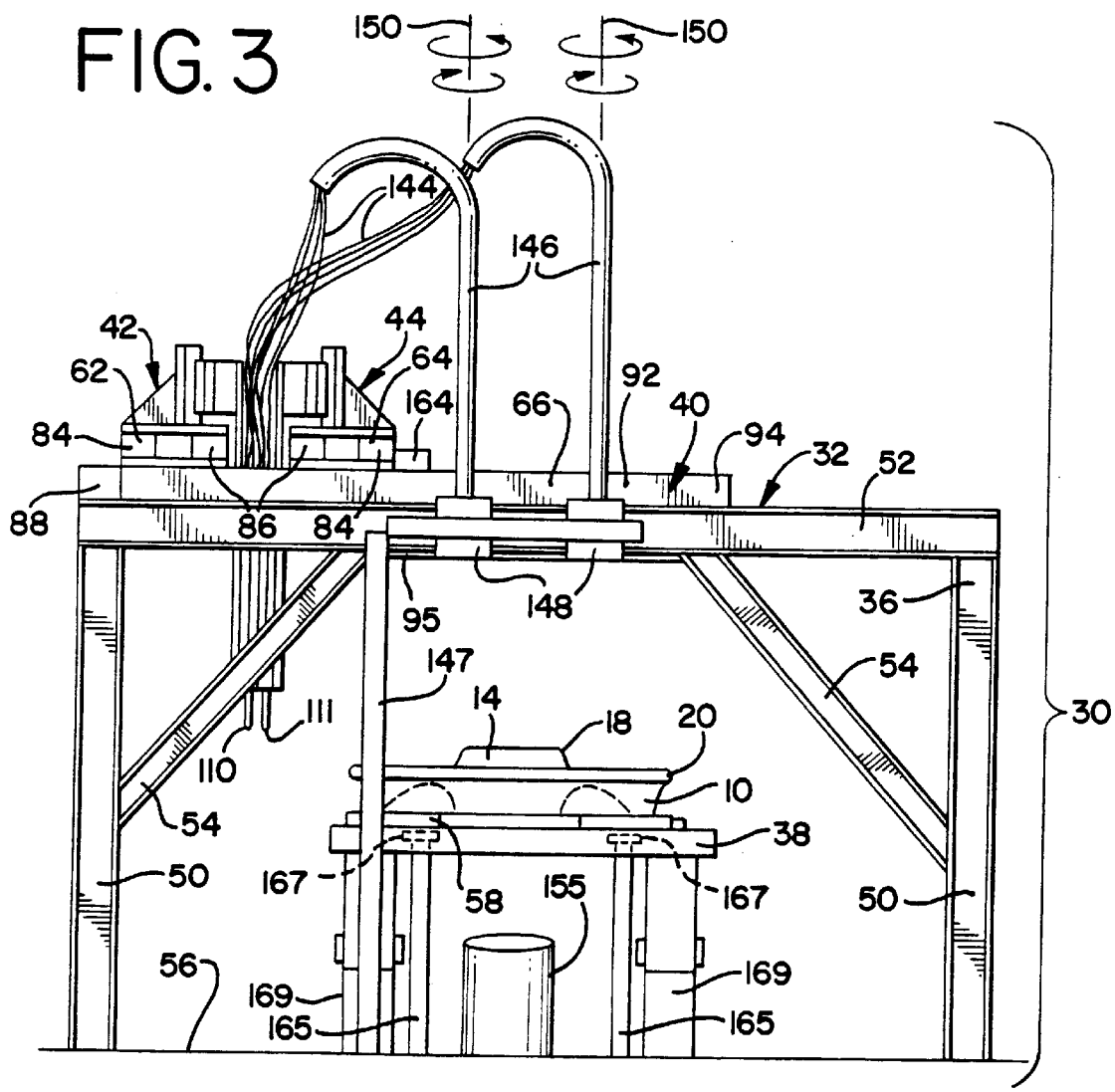
FIG. 3 is an elevation of one embodiment of a hub cutting station that may be used with the method and system of the present invention.
Figure 13:
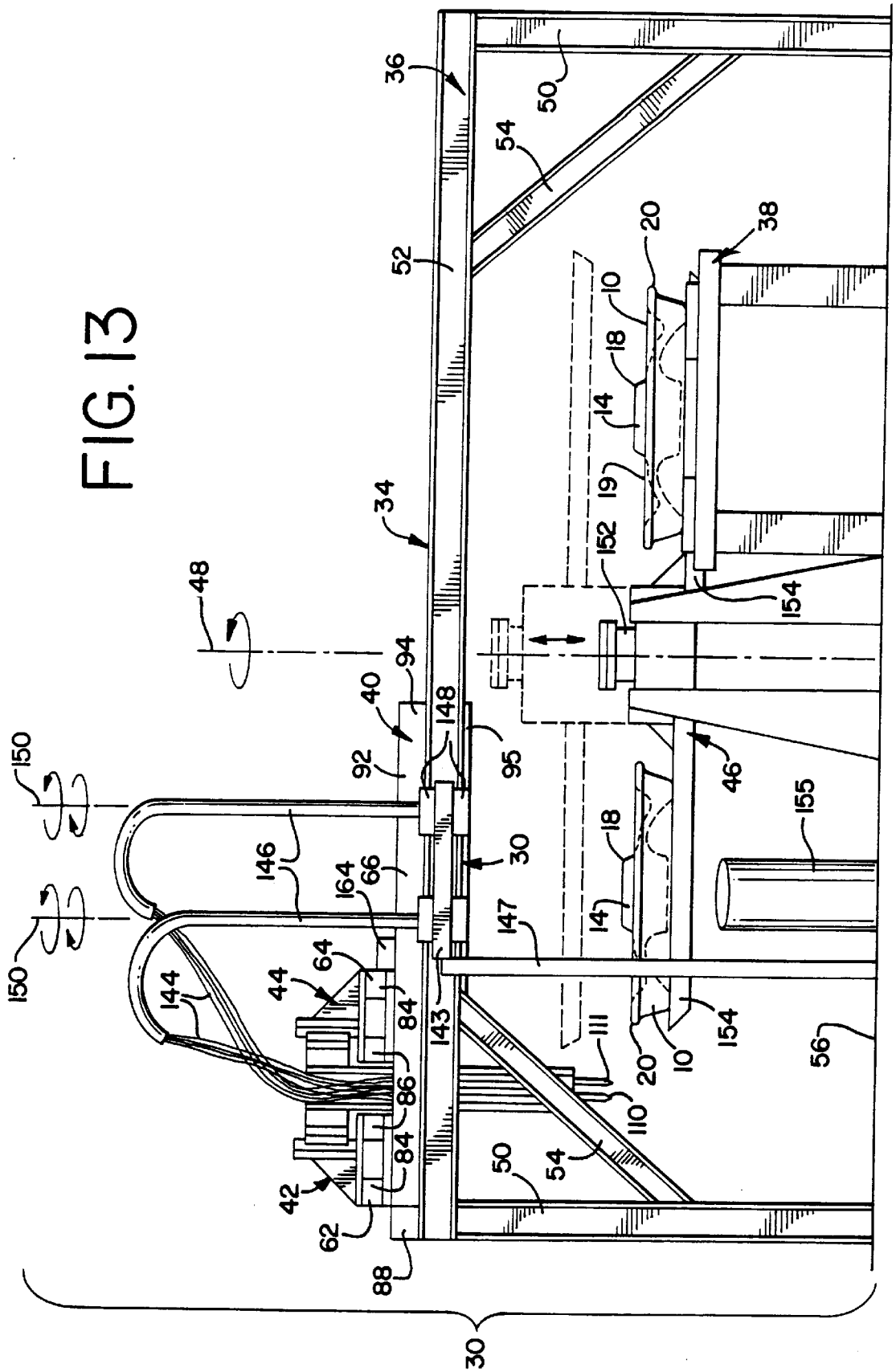
FIG. 13 is an elevation of an alternate embodiment of a hub-cutting station that may be used with the method and system of the present invention.

The hub cutting station 30 may overlie part of the conveyor line, or may utilize a mechanism for removing wheels from the manufacturing conveyor line and then reintroducing the wheels with hub bores into the conveying line. Alternative hub-cutting systems 32, 34 for these options are illustrated in FIGS. 3 and 13. In the figures for both systems 32, 34, like numbers have been used for like parts, and the description of common parts should be understood as being applicable to both embodiments. In the hub-cutting systems 32, 34 of FIGS. 3 and 13, there are provided a support frame 36, a conveying line 38, a gantry system 40 supported on the support frame 36, and a movable lead torch assembly 42 and second torch assembly 44. Each torch assembly carries a torch for cutting the hub bore 28 in each wheel 10. In the embodiment of FIG. 3, the gantry system 40 directly overlies the conveying line 38, so it is not necessary to remove the railroad wheel from the conveying line to cut the hub bore in the wheel. In the embodiment of FIG. 13, the support frame 36 straddles not only the conveying line 38, but also a rotating lift assembly 46 that raises to lift a railroad wheel 10 from the conveying line 38, turns about a central axis 48, and lowers beneath the gantry system 40 to position the wheel 10 for the hub-cutting operation. Thus, it should be understood that the dimensions of the support frame will vary with the application. The support frame for the FIG. 13 embodiment is longer and higher than that of the FIG. 3 embodiment since the FIG. 13 embodiment requires greater area for movement of the railroad wheels 10.

The illustrated support frames 36 comprise a plurality of spaced vertical support members 50, spaced horizontal support members 52 and braces 54. All of the support members 50, 52, 54 may comprise, for example, steel I-beams connected by any suitable means, such as by welding or by some mechanical connection. In the embodiment of FIG. 13, the two vertical members 50 on each side of the frame are spaced apart a distance of about sixteen feet, and the horizontal members 52 are spaced about five and one-half feet above the factory floor 56. In the embodiment of FIG. 3, the two vertical members 50 are placed closer together, and the horizontal members 52 could be placed nearer to the factory floor 56. It should be understood that these support frame structures are identified for purposes of illustration only, and the present invention is not limited to any particular support frame structure.

As shown in FIGS. 3 and 7, the conveying line 38 may be as is typical in the prior art, with power rollers 58 or other devices for moving the hot wheels 10 down the line. The hub-cutting system 32 of FIG. 3 comprises a station in or along the conveying line, such as at a position downstream of a cooling and sprue removal station (not shown) and upstream, for example, of a heat treating station (not shown).

Figure 11:
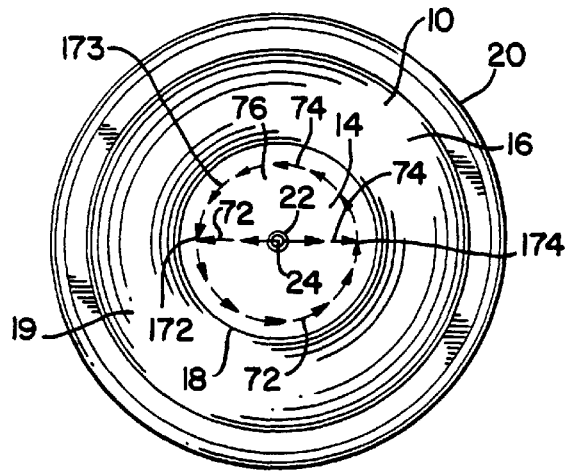
FIG. 11 is a top plan view of a railroad wheel, showing in phantom lines the cutting paths for a hub-cutting system using two torches.
Figure 12:
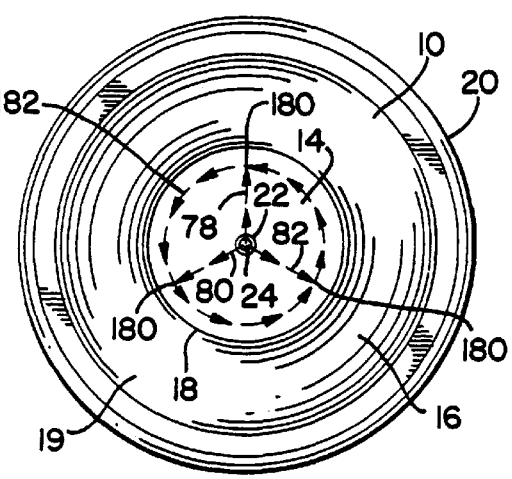
FIG. 12 is a top plan view of a railroad wheel showing in phantom lines the cutting paths for a hub-cutting system using three torches.

The gantry system 40 used in the embodiments illustrated in FIGS. 3 and 13 is a linear positioning system. As shown in FIGS. 4–6, the illustrated gantry system 40 has a first Y-table assembly 62 supporting the lead torch assembly 42 and a second Y-table assembly 64 supporting the second torch assembly 44. The gantry system 40 of FIG. 5 is a dual axis system, with the first and second Y-table assemblies 62, 64 supported on spaced linear X-direction drive mechanisms 90, 92; alternatively, as shown in FIG. 6, the first Y-table assembly 62 may be supported on a first X-table assembly 68 and the second Y-table assembly 64 may be supported on a second X-table assembly 70, each X-table assembly 68, 70 comprising a pair of spaced linear drive and follower or idler mechanisms 91, 93. Use of either such gantry system allows for the lead torch assembly 42 to be positioned to be aligned over the hollow stopper pipe 22 at the center 24 of the hub 14. Then, the lead torch assembly 42 may be moved while cutting radially outward from the hollow pipe 22 at the center of the hub to begin cutting a portion of the hub bore 28 along a lead torch cutting path 72, shown in FIG. 11. The second torch assembly 44 may then be moved into position aligned over the hollow pipe 22 at the center 24 of the hub 14 and then moved radially outward while cutting to begin cutting another portion of the hub bore 28 along the second torch cutting path 74, shown in FIG. 11. Each torch assembly 42, 44 may cut out a semi-circular or semi-cylindrical portion of the hub bore 28. Thus, the gantry system 40 allows both torch assemblies 42, 44 to be centered over the pipe 22 or hub center 24 at different times, and allows both torch assemblies to move independently to cut portions of the hub bore simultaneously, thereby substantially speeding the hub cutting operation. And since the paths 72, 74 of the torch assemblies 42, 44 also cut the waste hub center 76 into two pieces, as shown in FIG. 11, the waste hub center 76 should more easily drop from the wheel, eliminating any need for manually hammering or forcing the center out. Greater speed could also be achieved using a third torch assembly, resulting in three torch cutting paths 78, 80, 82 as shown in FIG. 12. Further additional torches could also be used.

The waste hub center 76 may be received in a receptacle or in a large diameter pipe 155 shown in FIGS. 3 and 13 that leads to a receptacle area beneath the floor. The waste hub centers may then be collected and reprocessed as scrap.

In both of the embodiments illustrated in FIGS. 5 and 6, the Y-table assemblies 62, 64 are moveable on the X-direction drive mechanisms 90, 92 or the X-table assemblies 68, 70, and the torch assemblies 42, 44 are movable on the Y-table assemblies 62, 64, thus allowing for movement of the torch assemblies 42, 44 in both the X and Y directions to follow the paths 72, 74. Either illustrated gantry system 40 may be controlled to move the torch assemblies 42, 44 in the X and Y directions to place the torches in a home position, such as the position shown in FIGS. 3 and 13, spaced from the wheel as the wheel is delivered into the area beneath the gantry system. The gantry system may also be controlled to move the torch assemblies to an initial position, to energize the torches while moving them in a straight line to make each radial cut and then to make each partial circumferential cut to complete the entire hub bore cut.

As seen in FIGS. 5 and 6, each Y-table assembly 62, 64 supporting each torch assembly 42, 44 in the illustrated embodiments comprises a linear drive mechanism 84 and a parallel linear support or follower mechanism 86. As both Y-table assemblies may be the same structure, only one is described, and like reference numbers are used for like parts. The linear drive mechanism 84 is driven by a drive motor assembly 88, and the linear follower or support mechanism 86 of each table assembly is an idler. Two linear mechanisms are provided for the Y-table assembly 62 of the illustrated embodiments to assure that the weight of the associated torch assembly 42 is adequately supported, although it should be understood that a single linear drive mechanism may be used for each Y-table assembly if it has sufficient weight-carrying capacity. The linear drive and follower mechanisms 84, 86 for each Y-table assembly 62, 64 are relatively closely spaced, about 8 inches apart, center to center, in the illustrated embodiments.

In the embodiment of FIG. 5, one of the X-direction linear drive mechanisms, such as linear drive mechanism 90, is connected to move one of the Y-table assemblies 64, and the other linear X-direction linear drive mechanism 92 is connected to move the other Y-table assembly 62. The linear drive mechanism 90 serves as a support for the Y-table assembly 62 and the linear drive mechanism 92 serves as a support for the Y-table assembly 64. In the embodiment of FIG. 6, each of the two X-table assemblies 68, 70 is comprised of parallel spaced linear drive and follower mechanisms 91, 93. One linear drive mechanism 91 of each X-table assembly 68, 70 is driven and the other linear mechanism 93 is an idler or follower mechanism. In the embodiment of FIG. 6, one of the Y-table assemblies, such as the Y-table assembly 62, is connected to one pair of spaced X-table assembly linear drive and follower mechanisms 91, 93, and the other Y-table assembly 64 is connected to the second pair of spaced X-table assembly linear drive and follower mechanisms 91, 93. In both embodiments, each Y-table assembly 62, 64 can be moved in the X-direction independently of movement of the other Y-table assembly 62, 64.

In both embodiments of FIGS. 5–6, the X-direction linear drive and follower mechanisms 90, 92, 91, 93 are spaced apart a sufficient distance to allow the Y-table assemblies 62, 64 to travel the necessary distance from the center 24 of the hub 14 to the desired circumference of the hub bore 28. In both embodiments, the X-direction linear drive and follower mechanisms 90, 92, 91, 93 are long enough to allow the second Y-table assembly 64 to be moved away from the wheel hub while the lead Y-table assembly 62 and lead torch assembly 42 are moved to center the lead torch 110 on the hub 14 to commence cutting, and then to move the second Y-table assembly 64 and second torch assembly 44 into position over the hub 14 to center the second torch 111 on the hub 14 to commence cutting after the lead Y-table assembly 62 and lead torch assembly 44 have moved out of the way. In the illustrated embodiments, the linear drive and follower mechanisms 84, 86 for each Y-table assembly, are spaced apart a distance of about 8 inches, from center to center. The Y-table assembly linear drive and follower mechanisms 84, 86 in the FIG. 5 embodiment may have an overall length of about 41 and ¾ inches, for example, thereby spacing the X direction linear drive and follower mechanisms 90, 92, 91, 93 a distance of about 36 inches, from centerline to centerline, and providing an effective stroke distance for the lead and second torch assemblies 42, 44 of a distance of about 21 inches in the Y direction. The X direction linear drive and follower mechanisms 90, 92, 91, 93 may have a length of about 98 and ¾ inches, yielding an effective stroke distance in the X direction of a distance of about 72 inches. A gantry system 40 with these dimensions should be able to accommodate a 42 inch diameter wheel. It should be understood that these dimensions are given for purposes of illustration only. Both sets of X and Y direction linear drive and follower mechanisms 84, 86, 90, 92, 91, 93 allow each torch 110, 111 to be centered over the hub at the hollow stopper pipe 22 and to be moved independently.

Figure 9:
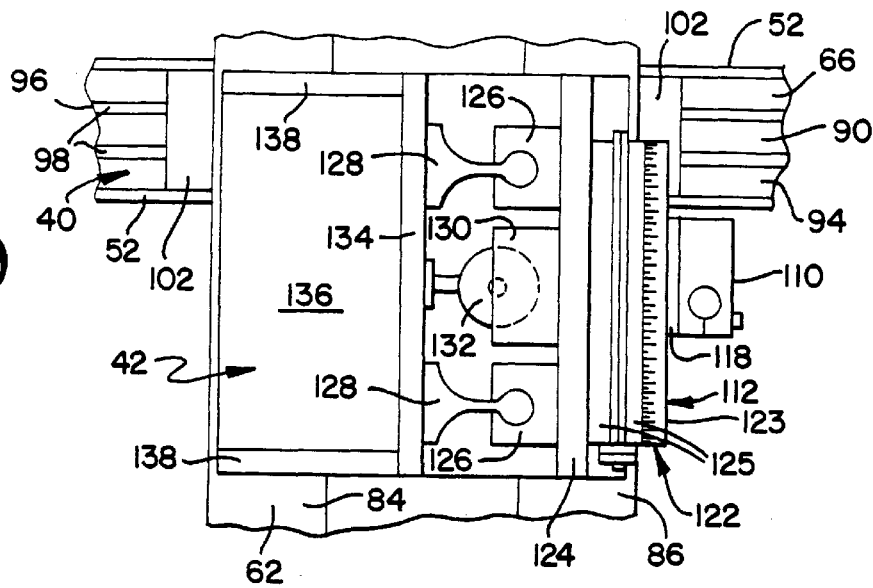
FIG. 9 is a top plan view of the torch assembly of FIG. 8.

Commercially available linear drive mechanisms may be used in the method and system of the present invention for both the Y-table assemblies 62, 64 and the X-direction linear drive and follower mechanisms 90, 92 or X-table assemblies 68, 70. Suitable linear drives and followers are available from the Parker Hannifin Corp. Daedal Division, of Harrison City, Pa., and identified as MOD 204060RB-EC-LHM and 204XXXRB-FT MOD204XXXRB-SC-LHM. These drive and follower mechanisms are supplied by RSA, Inc. of St. Charles, Illinois as item number NSP081-4421 Rev E. These linear drive mechanisms are belt-driven, with the drive belt of each enclosed within an elongate housing 94. Such commercially available linear drive and follower mechanisms are advantageous in that they do not contain components that require lubrication that cannot be shielded from heat. Accordingly, the prior art problem of coagulation of lubricant should be avoided. Heat shielding can be incorporated into each of the linear drive and follower mechanisms, or could be placed at any suitable location, such as along a length of the bottom side of each horizontal frame member 52, as shown at 95 in FIGS. 3, 7 and 13, for example. Any suitable heat shielding material may be used, such as, for example, high-temperature insulation board available from McMaster-Carr Supply Company of Elmhurst, Illinois, part no. 9353K51. The elongate housings 94 may be sealed to prevent contamination. Thus, as shown in FIG. 9, the slots 96 along each face of the housing 94 may be sealed with wiper seals 98 to prevent contamination; the wiper seal 98 material should be one capable of withstanding the high temperatures in this environment. Each housing may also have fittings for inputs and outlets of air to be moved through the housing for cooling the components and reduce debris; the purge air input may come from a pressurized supply such as a 50 psi supply.

In the embodiment of FIG. 5, the lead Y-table assembly 62 has a driven carriage mounting plate 100 fixed to each lead Y-table assembly linear drive and follower mechanism 84, 86 of the Y-table assembly near one end, and a belt-through carriage mounting plate 102 fixed to the other end of each of those lead Y-table assembly linear drives and followers. The lead Y-table assembly driven carriage mounting plate 100 is connected to be driven by the internal drive belt of one of the lead X-direction linear drives, shown at 92 in FIG. 5, and the lead Y-table assembly belt-through carriage mounting plate 102 is free from any connection to the belt drive of the X-direction linear drive 90 so that the belt-through carriage mounting plate 102 moves on that X-direction linear drive housing 94 independently of any movement of the internal X-direction belt drive for that linear drive 90. The second Y-table assembly 64 also has a driven carriage mounting plate 104 fixed to one end of each second Y-table assembly linear drive and follower mechanisms 84, 86 near one end and a belt-through carriage mounting plate 106 fixed to the opposite end of each second Y-table assembly linear drive and follower mechanisms. The second Y-table assembly driven mounting plate 104 is connected to be driven by the internal drive belt of the opposite X-direction linear drive mechanism 90, and the second belt-through carriage mounting plate 106 is free from any connection to the belt drive of the X-direction linear drive mechanism 92 that moves the lead Y-table assembly so that the belt-through carriage mounting plate moves in the X-direction independently of any movement of the internal belt drive that moves the lead Y-table assembly 62. Thus, both Y-table assemblies 62, 64 in the FIG. 5 embodiment may move in the X-direction independently. All of the carriage mounting plates 100, 102, 104, 106 may be made of aluminum or other desirable material.

Figure 15:
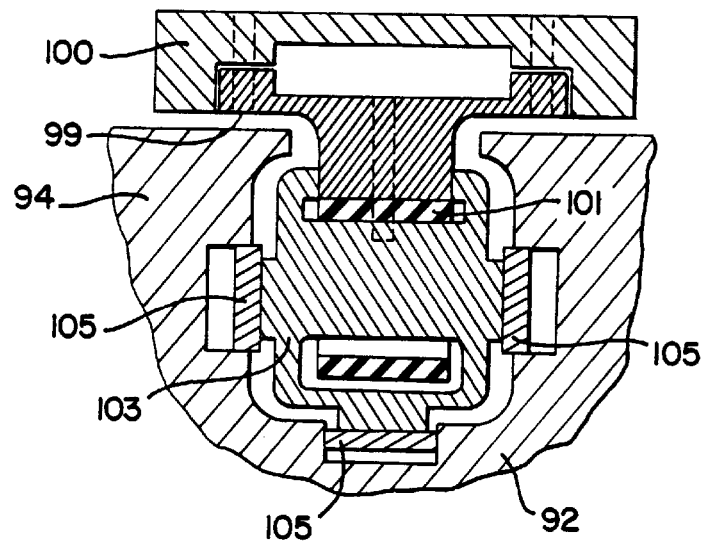
FIG. 15 is a cross-section taken along line 15—15 of FIG. 5.

The drive train in such linear drive mechanisms is relatively tightly coupled to allow for tighter tolerances and repeatability in positioning the torches. As shown in FIG. 15, the driven mounting plate 100 is connected through screws or the like to an underlying adaptor plate 99 that is fixed through screws or the like to the drive belt 101 and carriage 103. The carriage 103 has wheels 105 that roll within channels in the housing 94. The drive belt 101 and carriage 103 may have mating teeth to assure a tight connection. With such tighter tolerances, the cuts can be adjusted so that the difference between the torch or flame cut and the machined bore can be minimized, thereby minimizing the amount of metal that must be removed by a boring mill downstream of the hubcutting station. With less metal removed by the boring mill, the life of inserts on the mill should be extended and the mill can be run at faster boring times. The same type of structure may be used for supporting and moving the other driven carriage mounting plate 104.

Figure 16:
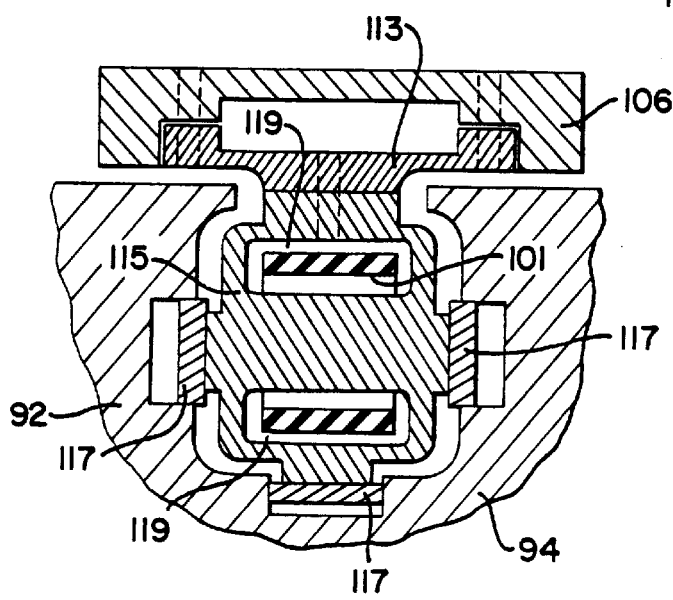
FIG. 16 is a cross-section taken along line 16—16 of FIG. 5.

The belt-through carriage mounting plate 106 of FIG. 16 is connected to an underlying carriage adaptor plate 113 and carriage 115 with wheels 117 that roll in tracks in the housing 94. The belt-through carriage mounting plate 106 is carried on the same X-linear drive mechanism 92 as the driven carriage mounting plate 100 but there is no connection between the drive belt 101 and the carriage 115 or carriage adaptor plate 113. The drive belt 101 fits within channels 119 in the carriage, and may move freely within the channels without contacting or moving the carriage 115 or adaptor plate 113. Thus, the drive belt 101 of the X-direction linear drive mechanism 92 may move the driven carriage mounting plate 100 without moving the belt-through mounting plate 106. And the belt-through mounting plate 106 may support and move with the Y-table assembly 64 without affecting the drive belt 101, the driven mounting plate 100 or the other Y-table assembly 62. The same structure may be used for supporting and moving the other belt-through mounting plate 102 on the opposite X-direction linear drive mechanism 90. The drive belt of the other X-direction linear drive 90 may move the other driven carriage mounting plate 104 without moving the other belt-through mounting plate 102.

In the embodiment illustrated in FIG. 6, each Y-table assembly 62, 64 has two carriage mounting plates 108 that are fixed to the Y-table assembly near the ends and connected to the belt drives of the X-table assembly linear drive and follower mechanisms 91, 93. For each X-table assembly, the linear drive mechanism 91 is connected to a drive motor assembly 88, and the follower mechanism 93 of each X-table assembly is essentially an idler provided for support. Each Y-table assembly 62, 64 is connected to the drive belt means of the linear drive mechanism 91 of one of the X-table assemblies in this embodiment so that both Y-table assemblies 62, 64 may also move independently in the X-direction, as in the FIG. 5 embodiment. All of the carriage mounting plates 108 in the FIG. 6 embodiment may be supported and connected as shown in FIG. 15.

Thus, the system of the present invention includes lead and second movement means that are arranged parallel to each other. The lead and central movement means in the illustrated embodiments comprise the Y-table assemblies 62, 64, which are comprised of the Y linear drive and follower mechanisms 84, 86. Equivalent structures would include Y-tables each comprised of a single linear drive mechanism. A third linear movement means is perpendicular to the lead and second movement means. The lead and second linear movement means are supported by the third linear movement means and connected for independent movement along the third linear movement means. The third linear movement means in the illustrated embodiments comprises either the two X-table assemblies 68, 70 each with a linear drive mechanism 91 and a linear follower mechanism 93 or the set of parallel X-direction linear drives 90, 92 as shown in FIG. 5. Each of the third linear movement means drive mechanisms 90, 92 of the FIG. 5 embodiment has a continuous drive means, such as the drive belt 101 shown in FIGS. 15–16. In the FIG. 5 embodiment, the lead linear movement means is connected to move with the movement of the continuous drive means 101 of drive mechanism 92, and is independent of movement of the continuous drive means of the second linear drive mechanism 90. In the FIG. 5 embodiment, the second linear movement means is connected to move with the movement of the continuous drive means of the second drive mechanism 90, and is independent of movement of the continuous drive means of the first drive mechanism 92. It should be understood that other structures could be used for the lead, second and third linear movement means, and that the present invention is not limited to the illustrated movement means.

There are drive motor assemblies 88 in each of the embodiments illustrated in FIGS. 5 and 6, to drive the movement of the belt drives in each of the linear drive mechanisms 91 of each X-table assembly 68, 70, of the belt drives of each X-direction linear drive 90, 92 and of the belt drives in each of the linear drive mechanisms 84 of each Y-table assembly 62, 64. Thus, there are four drive motor assemblies 88 in the embodiments of FIG. 5 and 6. Each drive motor assembly 88 in the illustrated embodiments comprises a servo-motor and gearhead, and may comprise part of the lead, second and third movement means. Suitable servo-motors and gearheads are commercially available from Customer Servo-Motors, Inc. of Eden Prairie, Minn. and Bayside Controls, Inc. of Port Washington, N.Y., and supplied by RSA, Inc. of St. Charles, Ill. under the designations MPM891FRME-AM and PG90-030. Other commercially available drive system components that may be used include safety couplings available from Gerwah-Prazison GmbH of GroBwallstadt, Germany, and servo-amplifiers and a six axes rack with power supply available from Custom Servo-Motors, and all supplied by RSA, Inc. as item numbers DBK/DK 10-20-5/8-10, AC-03 and CP-6-030, respectively. It should be understood that these drive components are identified for purposes of illustration only, and that the invention is not limited to any particular drive assembly or component.

It should also be understood that the linear drives are identified for purposes of illustration only, and that the present invention is not limited to any particular linear drive, and is not limited to linear drives. Alternative systems may be used for positioning the lead torch assembly 42 and second torch assembly 44. For example, each of the torch assemblies could be attached to a pivotable arm so that the lead torch assembly first swings into place over the central stopper pipe 22, pivoting about a vertical axis spaced from the lead torch assembly. The lead torch assembly may then move radially outward and then the second torch assembly could swing into place over the central stopper pipe 22, and be moved radially outward. Both torch assemblies could cut along paths such as those shown at 72 and 74 in FIG. 11.

It may also be possible to employ a dual-torch assembly on a circumferential drive. Preferably, such a drive would be heat-shielded and avoid the use of lubricants that could coagulate and cause a gear to run amiss. It may also be possible to employ a system utilizing additional torch assemblies to further speed the hubcutting operation, such as using a system with three or more torch assemblies, following the torch cutting paths 78, 80, 82 as shown in FIG. 12, for example. As another alternative, a gantry system similar to that illustrated could be used to move the torch assemblies from the center of the stopper pipe radially outward to the desired circumference of the hub bore, and then the table supporting the wheel could be rotated while the torch assemblies are held stationary to cut the hub bore. Further, the torches could be moved linearly outward and then the torches could be rotated to cut the circumference of the hub bore through use of a rotary table mechanism.

It should also be understood that the designation of lead and second elements, such as the lead and second torch assemblies 42, 44 has been for purposes of illustration only. In practice, either the right or left torch assembly could be the lead torch assembly and connections to linear drive assemblies may be other than as shown.

Both the lead torch assembly 42 and second torch assembly 44 are similarly structured, and only the lead torch assembly is described herein. It should be understood that the following description applies as well to the second torch assembly. As shown in detail in FIGS. 8-9, the lead torch assembly 42 includes a torch 110, and a torch carriage means 112. Each torch carriage means 112 includes a torch clamp assembly 114 holding the torch 110. The torch clamp assembly 114 includes a pair of vertically aligned torch clamps 116 connected to a vertical member 118. The illustrated torch clamps 116 are aluminum blocks with a central bore and a split from the bore to one side, with a clamp screw for tightening around the shaft of the torch. The vertical member 118 in the illustrated embodiment may comprise an elongate aluminum plate to which the clamps 116 are attached by screws. As shown in FIG. 8, heat shielding material, such as high-temperature insulation board 121, may be placed along the lower side of the lower clamp to protect the elements from the heat of the wheel and the cutting operation. In the illustrated embodiment, the top part of the vertical member 118 of the torch clamp assembly 114 is fixed to a part of a combination vise 122. The combination vise 122 is connected to a combination vise mounting plate 124. The combination vise 122 may be turned about two axes and locked in a desired position to adjust the orientation of the torch 110, to thereby assure that the torch is properly squared with respect to the wheels. The illustrated combination vise 122 is an adapted milling machine combination vise that enables the torch head to be adjusted at an angle in two directions. It has a rotatable plate 123 mounted to a pair of hinged plates 125, with set screws for locking each in a desired position. Use of such a device allows for fine adjustment of the torch head to achieve an optimal perpendicular cut to the horizontal plane of the hub face of the wheel to be processed. It is a Heavy Duty Compound Angle Swivel Base, part no. 5198A4, available from McMaster-Carr Supply Company of Elmhurst, Ill. It should be understood that such a combination vise 122 comprises one example of a means for controlling the angular position of the torch with respect to the wheel, and that this particular device is identified for purposes of illustration only; other angular control means may be used to true the torch to the wheel, and that the present invention is not limited to any particular device. Moreover, any angular control means used need not be positioned as shown, but could be disposed elsewhere on the torch clamp assembly 114.

The torch 110 that is used in the present invention may comprise, for example, a post-mix combustion oxy-fuel torch that may move and cut at a rate of about 13 inches per minute through a hub thickness of 6–8 inches. Such post-mix torches cut at a rate about 30% faster than the standard 10 inches per minute of conventional torches cutting through a hub thickness of 6–8 inches. Moreover, pre-heating delays associated with the use of conventional torches may be eliminated with such post-mix torches. Such torches may also be safer to operate in that the mixing of materials occurs outside of the torch. Suitable torches are commercially available from ESAB Welding & Cutting Products of Florence, S.C., under the designation "OXWELD", PM 100, part no. 2118100. It should be understood that this commercial torch is identified for purposes of illustration only, and the invention is not limited to any particular torch, whether post-mix or not. The same torches may be used for the lead torch 110 and second torch 111 of the first and second torch assemblies 42, 44.

Use of a post-mix torch is also advantageous in that the torch need not be positioned as close to the wheel as conventional torches must. Conventional torches must typically be within a distance of about ⅜ of an inch of the wheel hub surface to perform the cutting operation, while a post-mix torch can perform the cutting operation while spaced a distance of about 4–6 inches away from the wheel hub surface. With a post-mix torch, it should not be necessary to move the torch vertically when cutting is performed. The illustrated torch carriage means 112 is designed to accept either a post-mix torch or a conventional torch that must be moved vertically toward the wheel hub surface to commence the cutting operation. To accomplish this movement in the illustrated embodiment, the back side of the combination vise mounting plate 124 is attached to a pair of vertically-oriented linear bearings 126 that each receives a linear rail 128, as shown in FIGS. 8–9. There is also a horizontally-disposed plate 130 on the back side of the combination vise mounting plate 124. One side of the horizontally-disposed plate 130 is fixed to or juxtaposed with the piston of an air cylinder 132. The air cylinder 132 may be operated to raise the torch. The illustrated air cylinder 132 is a one-inch stroke cylinder, and any conventional air cylinder or like device could be used for this purpose.

As shown in FIGS. 8–9, in the illustrated embodiment, the rails 128 and air cylinder 132 are attached to a vertical torch base plate 134, which is attached to a horizontal base plate 136. Two triangular brackets 138 are attached to both the vertical and horizontal base plates 134, 136 for support. The horizontal base plate 136 is connected to an attachment plate 140 that bridges and is attached to two parallel carriage plates 142. The carriage plates 142 are connected to be move with the drive belts of the underlying Y-table linear drive and follower mechanisms 84, 86. The connections may be similar to those shown in FIG. 15.

It should be understood that if only a post-mix torch is to be used, it should not be necessary to provide for vertical movement of the torch and should not be necessary to use the linear bearings 126, linear rails 128, horizontal plates 130 and air cylinder 132; instead the combination vise could be mounted directly on the vertical base plate 134.

Preferably, if two Y-table assembly linear drive and follower mechanisms 84, 86 are used for each Y-table assembly 62, 64, the weight of the entire torch assembly 42, 44 is centered between the linear drive and follower assemblies 84, 86. The triangular brackets 138 may be sized and shaped and made of a material that will optimize the weight distribution so that the center of gravity of each torch assembly 42, 44 is centered between the Y-table assembly linear drive and follower mechanisms 84, 86. The combination vise mounting plate 124, horizontal plates 130, vertical torch base plate 134, horizontal torch base plate 136, triangular brackets 138, attachment plate 140 and carriage plates 142 may all be made of steel or any other desirable material having sufficient strength to meet the function of the element.

Torches 110, 111 of different lengths may be used in the illustrated torch assemblies. For example, the torch may have a shank length of 20 inches or 38 inches. With a shorter torch, it may be necessary to use only the lower torch clamp 116.

As shown in FIGS. 3 and 13, the hoses 144 to feed the torches 110, 111 with combustible material may be fed through swivel torch hose carriers 146, one hose carrier 146 for each torch 110, 111. One of the hoses 144 may also supply a coolant such as water to the torch, for example. Each hose carrier 146 may carry, for example, five hoses for the torch. The hose carriers may be metal tubes. As shown in FIG. 7, the hose carriers 146 may be supported by a rectangular steel tube 143 that is welded to another rectangular steel tube 145 that is welded to the horizontal frame member 52 of the support frame 36. The hose carriers 146 may be mounted to the steel tube 143 through flange bearings 148 that allow the hose carriers 146 to swivel or turn about axes labeled 150 in FIGS. 3 and 13. The steel tube 143 may be welded to a support member 147 that supports the weight of the assembly on the factory floor. Each hose carrier 146 is bent to arch over the X-table assemblies 68, 70 or X-direction drives 90, 92 and the Y-table assemblies 62, 64, and to follow the full range of motion of the torches 110, 111 on the gantry system 40. The hose carriers 146 should be sized and shaped to minimize abrasion of the hoses carried within, and to space and protect the hoses from the high temperature environment near the hot wheel 10. The hose carriers 146 may be lined with a suitable material to minimize abrasion and provide such protection from heat. The number and type of hose to be carried will vary with the type of torch used, and it should be understood that the hose carriers may be made to accommodate any number or type of hose.

As shown in the FIG. 13 embodiment, the system and method of the present invention may be used with a conventional rotating lift assembly 46. The rotating lift assembly 46 is used to lift a wheel 10 and remove it from the conveyor line 38 and deliver the wheel to the work area of the hub-cutting system 34 spaced from the conveyor line. The illustrated rotating lift assembly 46 comprises a central element 152 with a central vertical axis 48 about which the assembly may rotate. Two sets of diametrically-opposed wheel pick up arms 154 extend outward from the central element 152. Each set of wheel pick up arms 154 comprises two spaced parallel arm elements, and each arm element has a substantially horizontal wheel pick up surface. The central element 152 can be raised and lowered along its central vertical axis, as shown by the vertical arrow in FIG. 13, thereby raising and lowering the wheel pick up arms 154. The lift assembly 46 may be turned 180 degrees about the central vertical axis 48 of the central member 152. Thus, to bring an unfinished wheel to the hub-cutter system 34 in the FIG. 13 embodiment, the pair of lowered wheel pick up arms 154 may be placed beneath the conveyor 38 and then raised to lift the wheel from the conveyor. The wheel would then be supported on the horizontal wheel pick up surface. The lift assembly may then be rotated 180 degrees to place the unfinished wheel beneath the gantry system of the hub-cutting system 34. Then, depending upon the types of torches used, the torches may be lowered into a position nearer to the horizontal hub surface or may be maintained spaced from the wheel hub surface and the cutting operation begun. After the wheel hub has been fully cut, the lift assembly 46 may again be rotated 180 degrees and then lowered to place the wheel with the hub cut back onto the conveyor 38. The conveyor may then be advanced to place another unfinished wheel above the wheel pick up arms 154. The lift assembly may be lowered during the hub cutting operation and then lifted before it is rotated so that a wheel will be picked up by the opposite wheel pick up arm and brought into position under the gantry when the first pick up arm is rotated back to the conveyor. The torch assemblies 42, 44 should be moved to the home position shown in FIG. 13 before the rotating lift assembly 46 is raised so that there is no interference between the lift assembly 46 and the torches 110, 111. The rotating lift assembly 46 may be powered by any conventional means, such as through hydraulic components, as will be understood by those in the art. While the method and system of the present invention may be used with such a device or other means for removing a wheel from the conveyor line, delivering the wheel to the hub-cutting system work area, and returning the wheel to the conveyor line, for maximum speed and efficiency of operation, it is preferred to position the hub-cutting system directly over the conveyor line, as shown in FIG. 3.

Figure 14:
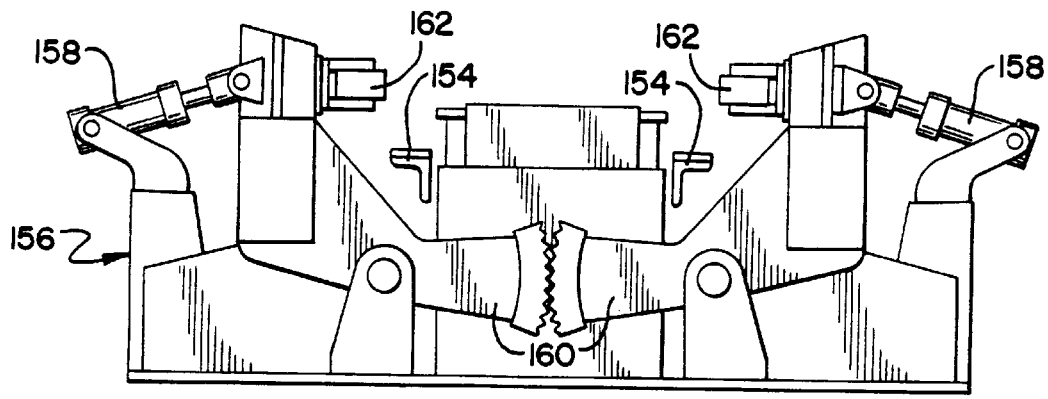
FIG. 14 is an elevation of a wheel centering device that may be used with the method of the present invention.

Beneath the hub-cutting torches 110, 111, it may be desirable to utilize a mechanical means for positioning the wheel in a known position relative to the torches. Known wheel centering devices may be used for this purpose. An example of a suitable wheel centering device 156 is illustrated in FIG. 14. As there shown, opposed hydraulic cylinders 158, equalizing gears 160 and rollers 162 may be used to push the wheel into a preferred position. As shown in FIG. 14, the illustrated centering means 156 may be used with the rotating lift assembly 46 of FIG. 13, with the wheel pick up arms 154 of the lift assembly lowering beneath and between the rollers 162. The illustrated centering means may then push the rollers 162 against the wheel rim to center the wheel. A similar apparatus could be attached to the conveyor line for use with the embodiment of FIG. 3.

Figure 10:
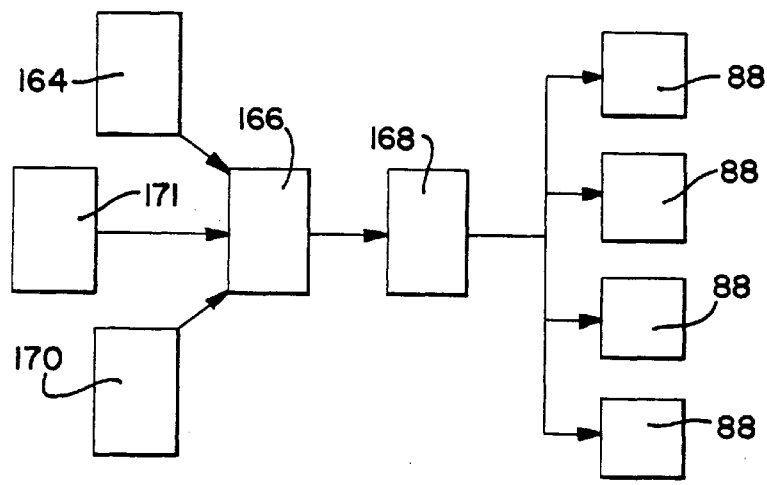
FIG. 10 is a schematic showing various inputs and controls that may be used with the controller of the method and system of the present invention.

An alternative preferred system and method for ensuring the proper relative positions of the torches and the wheels relies upon a means for sensing the position of each wheel as the wheel is received at the hub-cutting system 32, 34. The position sensing means may comprise a visual or optical processing system. As shown in FIGS. 3 and 13, such a system could include a scanner or camera 164 mounted to one of the Y-table assemblies, such as the second Y-table assembly 64, with its field of vision encompassing the general area where the unfinished wheel is expected to be located beneath the gantry system. The illustrated scanner or camera 164 is mounted so that when the torch assemblies are in their home position, such as the position shown in FIG. 3, the scanner or camera 164 is nearest the area where the wheel is to be received. The wheel may be scanned for some physical feature that bears a known relationship to the center 24 of the hub 14, such as the edge 18 at the outer circumference of the hub. The position of the feature, such as the hub outer edge 18, may then be sent to a computer or logic element 166, shown schematically in FIG. 10. The computer 166 may be programmed to calculate the position of the center 24 of the hub 14 based upon the information received as to the position of the hub outer circumferential edge 18. The wheel may also be scanned for the position of the stopper pipe 22. The computer may direct a control means 168 which may then control the drive motor assemblies 88, shown schematically in FIG. 10. The drive motor assemblies 88 may then send the lead torch assembly 42 to position its torch 110 directly over the stopper pipe 22. The stopper pipe 22 position should correspond with the calculated hub center. If there is any difference between the sensed stopper pipe 22 position and the calculated hub center, the computer may adjust the path 72 of the torches to compensate for the discrepancy and ensure an optimum hub cut. The control means 168 may then direct that the torch 110 of the lead torch assembly be energized to begin cutting along a path such as the paths shown in FIGS. 11 and 12. Once the lead torch assembly 42 is out of the way, the control means 168 may then send the second torch assembly 44 to the hub center and position its torch 111 directly over the stopper pipe 22. Thus, instead of mechanically forcing each wheel into a predetermined position, use of such a sensing means would allow the position of the center of each wheel hub to be determined without moving the wheel, and moving the torches to the appropriate starting position.

A suitable commercially available visual or optical scanner is a Bueno Systems Linescan camera available from Kelburn Engineering Company of Chicago, Ill., part no. LS128. A suitable computer may be a XYCOM personal computer obtained from MacGregor & Co. of Glendale Heights, Ill., part no. 9460-513332-TFT-T-F. Such a personal computer allows for an operator interface, designated 171 in FIG. 10, to allow the operator to select features such as the desired bore size and input parameters such as the wheel or hub diameter. A suitable operator interface 171 is available from National Instruments Corporation of Austin, Tex., under the designation Lab Windows/CVI and may be used in conjunction with a XYCOM personal computer. A suitable control means may be a commercially available programmable controller such as item number XDC710 available from Custom Servo- Motors, Inc. of Eden Prairie, Minn. and supplied by RSA, Inc. of St. Charles, Ill. Although the computer 166 and control device 168 are shown as separate elements in FIG. 10, it should be understood that these elements may be combined in a single device. It should also be understood that these products are identified for purposes of illustration only, and that other products may be used. For the control means, any device that allows for control of the position and movement of the torch assemblies 42, 44 may be used. Preferably, such a control means may be programmed to respond to input from the scanning device or from a separate computer element to adjust the position and movement of the torch assemblies based upon the input, to respond to input from an operator or from a separate computer or other operator interface for control of parameters such as hub bore diameter, and also to control the speed of movement and operation of the torch assemblies in response to other input, as discussed below.

With such computer control of the movement of the torch assemblies 42, 44, it may also be desirable to optimize the speed at which the torches cut through the wheel hubs. To accomplish this control, the illustrated system uses a means 170 for sensing the temperature of the wheel. The temperature sensing means 170 may be mounted on one of the Y-table assemblies, such as the second Y-table assembly 64 as shown in FIGS. 5–6, and directed with its field of sensing encompassing the general area where the unfinished wheel is expected to be located beneath the gantry system 40. The illustrated temperature sensing means 170 is mounted so that when the torch assemblies 42, 44 are in their home position, such as the position shown in FIG. 3, the temperature sensing means 170 is nearest the area where the wheel is to be received. The illustrated temperature sensing means scans the wheel to determine the temperature of the wheel as it is positioned below the torches. The temperature sensing means may comprise a non-contact infrared temperature sensor directed to detect the temperature of each wheel processed. The temperature sensor may be a commercial sensor such as a Mikron Model M67S Series Infraducer available from Mikron Instrument Company, Inc., of Oakland, N.J., and supplied by Murphy & Dickey Incorporated of Hinsdale, Ill. Alternative non-contact temperature sensing means may be used, such as a thermographic camera. The output of the temperature sensor may be fed into the computer mechanism 166, as shown schematically in FIG. 10, which may be programmed to calculate a preferred cutting speed for the torches based upon the sensed temperature. The output of the computer 166 may be fed to the control mechanism 168, as shown schematically in FIG. 10, which may control the operation of the drive motor assemblies 88 to control the speed of movement and cutting of the torches 110, 111. Thus, the computer and control mechanism may direct the movement and cutting of the torches to be at the maximum rate of travel that yields an effective cut based on the temperature of the wheel being processed. The above-identified computer 166 and control means 168 may be used for this purpose, and it should be understood that the functions of the computer and control mechanism may be performed by a single device. It should be understood that the temperature sensor identified in this paragraph is identified for purposes of illustration only; other temperature sensors may be used.

It may also be desirable to use some means for leveling the wheel before cutting begins. An acceptable leveling means may comprise, for example, a table that is aligned to receive the wheel from the conveyor line and deliver the wheel back to the conveyor line after cutting is complete. As shown in FIGS. 3 and 7, another acceptable leveling means could also comprise a set of support legs 165 with level support arms 167 that are raised through the conveyor to lift the wheel slightly above the conveyor surface for cutting and that lower when cutting is complete to replace the wheel on the conveyor for transport. Alternatively, the legs 165 and level support arms 167 could be in a set position and a section of the conveyor line could be made to lower and place the wheel on the prepositioned level arms 167. As shown in FIGS. 3 and 7, the section of the conveyor could be supported on hinged support legs 169 that could be lowered to place the wheel on the level support arms 167 and then raised after the hub-cutting operation is complete. Any of the movable portions can be operated by any suitable means, such as through a hydraulic system that is controlled by the computer or control mechanism.

The wheel position sensing means 164, temperature sensing means 170, and leveling means, such as support legs 165 and arms 167, may be utilized in either the embodiment of FIG. 3 or FIG. 13. However, in the embodiment of FIG. 13, the arms 154 of the rotating lift assembly 46 may themselves comprise a leveling means for the wheel. The computer 166 and control means 168 may be positioned away from the high-temperature area, in a suitable cabinet (not shown) and electrically connected to the drive assemblies 88, wheel position sensing means 164, temperature sensing means 170, and actuators for the air cylinder 132 and leveler mechanism, such as a hydraulic system for the support legs 165, by any suitable electrical wiring (not shown). Suitable electrical wiring may also connect any limit switches to the computer 166 or controller 168.

In operation, the method of the present invention provides for cutting hub bores of pre-determined circumferences. A cast metal wheel 10 with a central hub 14 is provided. The unfinished wheel has a central hub 14 and a hollow stopper pipe 22 at its center 24. A hub cutting station 30 is provided with a hub-cutting system 32, 34, like those shown in FIG. 3 or FIG. 13. Each alternative hub-cutting system 32, 34 has a lead torch 110 and a second torch 111 for cutting the bore 28 in the hub 14 of the wheel 10.

The unfinished wheel 10 is conveyed to the hub cutting station 30. The wheel may be leveled at the hub-cutting station 30. The lead torch assembly 42 of the hub-cutting system 32, 34 is moved to an initial position near the wheel surface 19 and substantially aligned with the center 24 of the wheel hub 14. At the initial position, the lead torch is substantially aligned with the center of the stopper pipe 22. The hollow stopper pipe 22 provides a through-way that allows the torch to begin its cut. The lead torch 110 may then be energized to begin cutting at the stopper pipe 22 and to move in its energized state radially outward from the position aligned with the stopper pipe 22 to a position aligned with an initial radius point, shown at 172 in FIG. 11, along the desired hub bore circumference 173. Thus, the lead torch cuts along the path 72 shown in FIG. 11. Movement of the lead torch 110 may be accomplished by moving the lead torch assembly 42 on the lead Y-table assembly 62, and the lead Y-table assembly 62 moved on the X-direction linear drive and follower mechanisms 92, 90 of the FIG. 5 embodiment or the X-table 68 linear drive and follower mechanisms 91, 93 of the FIG. 6 embodiment. These movements may be powered by the drive motor assemblies 88 and controlled by the computer 166 and control means 168. Thus, the gantry system 40 may support the lead torch 110 for movement along perpendicular axes, and the lead torch 110 may be moved along the perpendicular axes.

Once the lead torch assembly 42 is out of the way, the second torch assembly 44 may be moved to place the second torch 111 in its initial position near the wheel hub surface 19, aligned with the center 24 of the wheel hub 14. At the initial position, the second torch is aligned with the center of the stopper pipe 22. The second torch 110 may then be energized to begin cutting at the stopper pipe 22 and to move in its energized state radially outward from the position aligned with the stopper pipe 22 to a position aligned with a second torch initial radius point, shown at 174 in FIG. 11, along the desired hub bore circumference 173. Movement of the second torch 111 may be accomplished by moving the second torch assembly 44 on the second Y-table assembly 64, and the second Y-table assembly 64 moved on the X-direction linear drive and follower mechanisms 90, 92 of the FIG. 5 embodiment or the X-table 70 linear drive and follower mechanisms 91, 93 of the FIG. 6 embodiment. These movements may be powered by the drive motor assemblies 88 and controlled by the computer 166 and control means 168. Thus, the gantry system 40 may support the second torch 111 for movement along perpendicular linear axes, and the second torch 111 may be moved along the perpendicular axes.

The second torch 111 cuts the hub bore along the second torch path, such as path 74 shown in FIG. 11. The two torches 110, 111 move and cut radially outward from the pipe 22 at the center of the hub in different directions. The lead torch 110 may reach the position aligned with the lead torch initial radius point 172 along the desired hub bore inner circumference 173 and then commence moving and cutting until it is aligned with another desired point on the desired hub bore circumference 173 to thereby cut around part of the desired inner circumference of the desired bore. The second torch 111 may also reach the position where it is aligned with the second torch initial radius point 174 along the desired hub bore inner circumference 173 and then commence moving and cutting until it is aligned with another desired point on the desired hub bore circumference 173. In the case of two torches, the second torch initial radius point 174 is diametrically opposite the lead torch initial radius point 172. The two torches then cut the entire hub bore 28, with the lead torch 110 reaching the second torch initial radius point 174 at the end of its cutting and the second torch 111 reaching the lead torch initial radius point 172 at the end of its cutting. Thus, the second torch initial radius point 174 is the end point for the cut made by the lead torch 110 and the lead torch initial radius point 172 is the end point for the cut made by the second torch 111.

As shown in FIG. 11, the desired hub bore circumference 173 coincides with parts of the two torch cutting paths 72, 74. When the cutting paths are complete, the hub center 76 should then fall in two pieces from the wheel and into the waste pipe 155. The wheel is then conveyed from the hub cutting station: depending on the system used, the wheel may be replaced on the conveyor line by the rotating lift assembly 46 of FIG. 13 or may simply be moved down the conveyor line in the system of FIG. 3.

As shown in FIG. 11, the cutting path may be counterclockwise, requiring that the torches move in a counterclockwise direction. As shown in FIGS. 5, 6 and 9, the torches 110, 111 are offset from the centers of the clamps 116 toward the center of the gantry system 40 midway between the X-direction linear drives 90, 92 of the FIG. 5 embodiment and midway between the X-direction linear drives and followers 91, 93 of the FIG. 6 embodiment. With the torches so offset, the torch assemblies 42, 44 must be moved in a counterclockwise direction to avoid interference between the two torch assemblies 42, 44 during cutting. This offset of the torches 110, 111 should facilitate efficient movement of the torch assemblies 42, 44.

The method of the present invention may be used with conventional mechanical wheel centering devices. In such a case, the position of the center of the stopper pipe 22 may be predetermined and X-Y coordinates preset so that the initial positions of the torches 110, 111 are constant. Limit switches may be employed to assure constant positions, and the shape and diameter of the hub bore may be predetermined and preset based on distances from the preset assumed position of the center of the stopper pipe 22. Thus, the X-Y coordinates for the initial radius point 172, 174, and coordinates for the remainder of the path 173 may be preset and stored in the control means 168.

But for even greater accuracy, before the lead torch assembly 42 is moved, the actual position of the stopper pipe 22 or center of the stopper pipe could be determined through scanning the wheel with the wheel sensing means 164. This information could then be fed to the computer 166 or controller 168 so that the X-Y coordinates for the initial positions of the lead and second torches can be determined. The lead torch 110 and second torch 111 may then be aligned at these coordinates for their initial positions, and thereby be aligned with the position of the hollow stopper pipe 22 as determined. With such a wheel sensing means 164, the wheel may also be scanned to determine the actual position of another physical feature of the wheel, such as the outer circumferential edge 18 of the hub portion. This information can be fed to the computer 166 or controller 168. From the actual position of this physical feature, the computer 166 or controller 168 may determine the position of the actual center of the hub 14 and the position of the appropriate cutting path 173 to cut the desired hub bore circumference based on the actual center of the hub, and can provide X-Y coordinates for the initial radius points 172, 174 and other points along the appropriate cutting path 173 for the desired hub bore circumference based on the actual center of the hub as determined through scanning and calculation, and can direct the torches to align with any calculated point on the cutting path 173. The scanned information may be correlated with information stored in the computer 166.

Thus, using the wheel sensing means 164, the method can compensate for any slight variations in the position of the stopper pipe 22 and can reasonably assure that the hub bore will be centered on the hub. If, for example, the stopper pipe 22 is not positioned at the center 24 of the wheel hub 14, the scanned position of the stopper pipe 22 is used so that the torches should always commence cutting at the stopper pipe; and the controller or computer may use the sensed position of the hub outer edge 18 to calculate or determine the coordinates of the center of the hub and the appropriate cutting path for the desired position of the hub bore circumference 28 based on the calculated center of the hub rather than on the mis-positioned stopper pipe. The cutting path may be adjusted to compensate for the offset of the stopper pipe.

For a plurality of wheels, the steps of sensing the position of the wheel feature and stopper pipe, aligning the torches with the position of the stopper pipe as determined, and determining the position of the appropriate cutting path for the desired circumference of the hub bore based on the results of scanning the wheel are preferably performed for each wheel in the series.

If a temperature sensing means 170 is included, the method of the present invention may include the step of sensing the temperature of the wheel and adjusting the rate of movement of the lead torch 110 and second torch 111 based on the sensed temperature.

Correlation of the scanned information with information related to a predetermined desired initial position for the lead and second torches, and determinations of the coordinates for the initial positions, initial radius points and other points along the appropriate cutting path, and appropriate torch positions to align with any of these points, may be preformed by a suitably programmed computer 166 that feeds the results of its operation to the control means 168, or by a suitable control means 168, or by a combined computer and control means. Suitable software for this function is available from National Instruments Corporation of Austin, Tex., under the designation Lab Windows/CVI and may be used in conjunction with a XYCOM personal computer. This software can also be used to integrate the results of the temperature scan with programmed information as to appropriate cutting speeds for different temperature ranges and feed the results of its operation to the control means to adjust the speed of operation of the drive motor assemblies 88.

The method may also be used with additional torches. If, for example, three torches are used, the torches could be moved to three evenly spaced initial radius points 180, as shown in FIG. 12, and the three torches could be moved around the desired hub bore inner circumference 182 in three paths.

It should be understood that although the lead and second torch assemblies 42, 44 may move independently of one another on the linear drive mechanisms, the movements of the assemblies should be controlled and coordinated to avoid collisions or interference between the moving torch assemblies 42, 44. Limit switches (not shown) may be placed, as will be understood by those skilled in the art, to provide feedback to the control means or computer to assure proper positioning of the torch assemblies 42, 44 and Y-tables 62, 64 and prevent catastrophic movement of the torch assemblies and Y-tables.

Use of the illustrated system and above-described method of the present invention should provide many manufacturing advantages. First, with more than one torch operating, the speed of hub bore cutting should be substantially increased, removing a production bottleneck. With the greater speed available with the present invention, it should be possible to incorporate the hub-cutting operation directly in the conveying line, to eliminate the need for removing wheels from and then replacing the wheel on the conveying line. Second, with the hub centers cut into two or more pieces, any need for manual removal of the hub centers should be eliminated. Third, although the present invention can be used with mechanical wheel centering devices, with the scanning system and computer control in use greater accuracy should be achieved, with fewer off-center hub bores. Thus, the number of scrap wheels should be reduced and the amount of machining required should be minimized. Fourth, with the temperature sensing system, hub cutting efficiency should be optimized along with improved consistency of the hub bores. Fifth, if one of the torch assemblies should become inoperable or need to be serviced, the hub-cutting apparatus could be operated with a single torch until the second torch was brought back on-line.

While only specific embodiments of the invention have been described and shown, those in the art should recognize that various modifications can be made thereto and alternatives used. In addition, it should be recognized that the present invention has applications beyond the illustrated environment. It is, therefore, the intention in the appended claims to cover all such modifications and alternatives and applications as may fall within the true scope of the invention.

We claim:

1. A method of cutting an object, the method comprising the steps of:

provi ding an object to be cut, the object having a plurality of sides;

providing a cutting apparatus with a movable lead torch and a movable second torch for cutting the object;

moving the lead torch to an initial position near the object;

energizing and moving the lead torch to cut through a part of the object;

moving the second torch to an initial position near the object;

energizing and moving the second torch to cut through a part of the object;

wherein the lead and second torches are capable of being moved independently of one another;

wherein the lead torch and second torch are each on the same side of the object and aligned with at least one common location on the object at different times;

and wherein the cut made by the second torch meets the cut made by the lead torch.

2. A method of cutting a hub bore in a railroad wheel, the hub bore having a desired circumference, the method comprising the steps of:

providing a railroad wheel with a central hub to be cut;

providing a cutting apparatus with a movable lead torch and a movable second torch for cutting the railroad wheel hub;

moving the lead torch to an initial position near the railroad wheel hub;

energizing and moving the lead torch to cut through a part of the railroad wheel hub;

moving the second torch to an initial position near the railroad wheel hub;

energizing and moving the second torch to cut through a part of the railroad wheel hub;

wherein the lead and second torches are capable of being moved independently of one another.

3. The method of claim 2 wherein the step of moving the lead torch to an initial position comprises moving the lead torch to a position substantially aligned with the center of the wheel hub and wherein the step of energizing and moving the lead torch to cut through a part of the wheel comprises moving the lead torch radially outwardly from the initial position to a position substantially aligned with a lead torch initial radius point along the desired circumference for the hub bore and moving the lead torch to another position substantially aligned with another point on the desired circumference of the hub bore while cutting a portion of the desired hub bore.

4. The method of claim 3 wherein the step of moving the second torch to an initial position comprises moving the second torch to a position substantially aligned with the center of the wheel hub after the lead torch has moved away from the lead torch initial position and wherein the step of energizing and moving the second torch to cut through a part of the wheel comprises moving the second torch radially outwardly from the initial position to a position substantially aligned with a second torch initial radius point along the desired circumference for the hub bore and moving the second torch from the second torch radius point to another position substantially aligned with another point on the desired circumference of the hub bore while cutting a portion of the desired hub bore.

5. The method of claim 4 wherein the lead torch cuts the wheel hub bore from the lead torch initial radius point to the second torch initial radius point and the second torch cuts the wheel hub bore from the second torch initial radius point to the lead torch initial radius point, the lead torch and second torch combining to cut the entire hub bore.

6. The method of claim 4 wherein the wheel has a hollow stopper pipe at the substantial center of the hub, wherein the step of moving the lead torch to a position substantially aligned with the center of the wheel hub comprises moving the lead torch to a position substantially aligned with the hollow stopper pipe and wherein the step of moving the second torch to a position substantially aligned with the center of the wheel hub comprises moving the second torch to a position substantially aligned with the hollow stopper pipe.

7. The method of claim 2 wherein the railroad wheel has a hollow stopper pipe in the hub of the wheel, the method further comprising the step of determining the position of the hollow stopper pipe, and wherein the step of moving the lead torch to an initial position near the object comprises aligning the lead torch with the hollow stopper pipe and wherein the step of moving the second torch to an initial position near the object comprises aligning the second torch with the hollow stopper pipe.

8. The method of claim 7 further comprising the step of scanning the wheel to determine the position of the stopper pipe and wherein the step of aligning the lead torch with the hollow stopper pipe comprises aligning the lead torch with the position of the hollow stopper pipe as determined through scanning and wherein the step of aligning the second torch with the hollow stopper pipe comprises aligning the second torch with the position of the hollow stopper pipe as determined through scanning.

9. The method of claim 8 further comprising the step of scanning the wheel for a physical feature of the wheel, determining the position of the appropriate cutting path to cut the desired hub bore circumference based on the results of scanning the wheel, wherein the step of energizing and moving the lead torch to cut through a part of the railroad wheel hub includes cutting along a portion of the appropriate cutting path and wherein the step of energizing and moving the second torch to cut through a part of the railroad wheel hub includes cutting along a portion of appropriate cutting path.

10. The method of claim 4 further comprising the step of scanning the wheel for a physical feature of the wheel, determining the position of the center of the wheel based on the results of scanning the wheel and determining the position of the cutting path to cut the desired circumference of the hub bore based on the results of scanning the wheel.

11. The method of claim 1 further comprising the step of sensing the temperature of the object and adjusting the rate of movement of the lead torch and second torch based on the sensed temperature.

12. The method of claim 1 wherein the step of moving the lead torch comprises moving the lead torch along perpendicular axes and the step of moving the second torch comprises moving the second torch along perpendicular axes.

13. The method of claim 2 further comprising the step of sensing the temperature of the railroad wheel and adjusting the rate of movement of the lead torch and second torch based on the sensed temperature.

14. A system for cutting objects, the system comprising:

a lead torch;

a second torch;

a gantry system for supporting the lead and second torches, the gantry system including:

lead and second linear movement means arranged parallel to each other;

a third linear movement means perpendicular to the lead and second linear movement means;

a lead torch carriage means for supporting the lead torch, the lead torch carriage means connected to be movable by the lead linear movement means; and a second torch carriage means for supporting the second torch, the second torch carriage means connected to be movable by the second linear movement means;

the lead and second linear movement means being supported by the third linear movement means and connected for independent movement along the third linear movement means.

15. The system of claim 14 further comprising means for sensing the temperature of the object and control means connected to receive input related to the sensed temperature of the object and to control the speed of operation of the lead and second torches based on the sensed temperature.

16. The system of claim 14 further comprising means for sensing the position of the object and control means connected to receive input related to the sensed position of the object and to control the movement of the lead and second torches based on the sensed position.

17. The system of claim 14 further comprising means for controlling the angular position of the lead torch with respect to the object and means for controlling the angular position of the second torch with respect to the object.

18. The system of claim 17 wherein both means for controlling the angular position allow for adjustment along more than one axis.

19. The system of claim 14 wherein the third linear movement means comprises spaced first and second linear drive mechanisms, each having a continuous drive means, and wherein the lead linear movement means is connected to move with the movement of the continuous drive of the first linear drive mechanism and is connected to be supported by the second linear drive mechanism and to be independent of movement of the continuous drive means of the second linear drive mechanism, and wherein the second linear movement means is connected to move with the movement of the continuous drive means of the second linear drive mechanism and is connected to be supported by the first linear drive mechanism and to be independent of movement of the continuous drive mechanism of the first drive means.

20. The system of claim 14 further comprising a conveying line positioned under the gantry system.

* * * * *